(12) United States Patent
Maejima et al.

(10) Patent No.: US 8,726,073 B2
(45) Date of Patent: May 13, 2014

(54) CONTROL APPARATUS AND CONTROL METHOD

(75) Inventors: Mitsuru Maejima, Kawasaki (JP); Yasuyuki Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 12/948,746

(22) Filed: Nov. 17, 2010
(Under 37 CFR 1.47)

(65) Prior Publication Data
US 2011/0219262 A1 Sep. 8, 2011

(30) Foreign Application Priority Data

Nov. 18, 2009 (JP) .................................. 2009-263058

(51) Int. Cl.
*G06F 11/00* (2006.01)

(52) U.S. Cl.
USPC ............................................. 714/14; 713/300

(58) Field of Classification Search
USPC .......................................................... 714/14
See application file for complete search history.

(56) References Cited

U.S. PATENT DOCUMENTS

| | | | |
|---|---|---|---|
| 5,740,988 A * | 4/1998 | Ausdenmoore ................. | 244/52 |
| 6,903,950 B2 | 6/2005 | Afzal et al. | |
| 7,683,598 B2 | 3/2010 | Hayakawa | |
| 7,705,483 B2 * | 4/2010 | Ozawa et al. ................... | 307/31 |
| 7,800,870 B2 * | 9/2010 | Matsumoto et al. ............ | 361/18 |
| 7,992,027 B2 | 8/2011 | Suzuki et al. | |
| 2004/0078508 A1 * | 4/2004 | Rivard .............................. | 711/4 |
| 2007/0067653 A1 | 3/2007 | Takemoto | |
| 2007/0168682 A1 * | 7/2007 | Nishimiya ...................... | 713/300 |
| 2007/0210649 A1 * | 9/2007 | Ozawa et al. .................... | 307/15 |
| 2008/0100274 A1 * | 5/2008 | Hayakawa ...................... | 323/284 |
| 2008/0162959 A1 * | 7/2008 | Kaizu .............................. | 713/310 |
| 2008/0244290 A1 * | 10/2008 | Yoshida et al. ................ | 713/320 |
| 2010/0315847 A1 * | 12/2010 | Maher ............................. | 363/50 |
| 2011/0010568 A1 * | 1/2011 | Kageyama et al. ............ | 713/300 |
| 2011/0191612 A1 * | 8/2011 | Itakura et al. .................. | 713/320 |
| 2011/0198924 A1 * | 8/2011 | Yamaki et al. .................. | 307/31 |
| 2011/0264952 A1 * | 10/2011 | Heinrichs et al. .............. | 714/14 |
| 2012/0144183 A1 * | 6/2012 | Heinrichs et al. ............. | 713/100 |

FOREIGN PATENT DOCUMENTS

| | | |
|---|---|---|
| JP | 11-265224 A | 9/1999 |
| JP | 2006-528479 A | 12/2006 |
| JP | 2007-86941 A | 4/2007 |
| JP | 2008-113499 A | 5/2008 |
| JP | 2008-193876 A | 8/2008 |

OTHER PUBLICATIONS

Japanese Office Action mailed May 28, 2013 for corresponding Japanese Application No. 2009-263058, with Partial English-language Translation.

* cited by examiner

*Primary Examiner* — Kamini Patel
(74) *Attorney, Agent, or Firm* — Fujitsu Patent Center

(57) ABSTRACT

A control apparatus controls a first and a second power supply units having a redundant configuration and converters connected to respective outputs of the power supply units. The power supply units generate a plurality of voltages and supply a storage device with the generated voltages through the respective converters. The control apparatus includes a determination unit for determining whether an abnormality occurs in a first voltage that the first power supply unit generates, upon the second power supply unit failing, and an instruction unit for instructing the converter connected to the first power supply unit to generate the first voltage on the basis of a second voltage that the first power supply unit generates, upon the abnormality occurring in the first voltage of the first power supply unit.

9 Claims, 11 Drawing Sheets

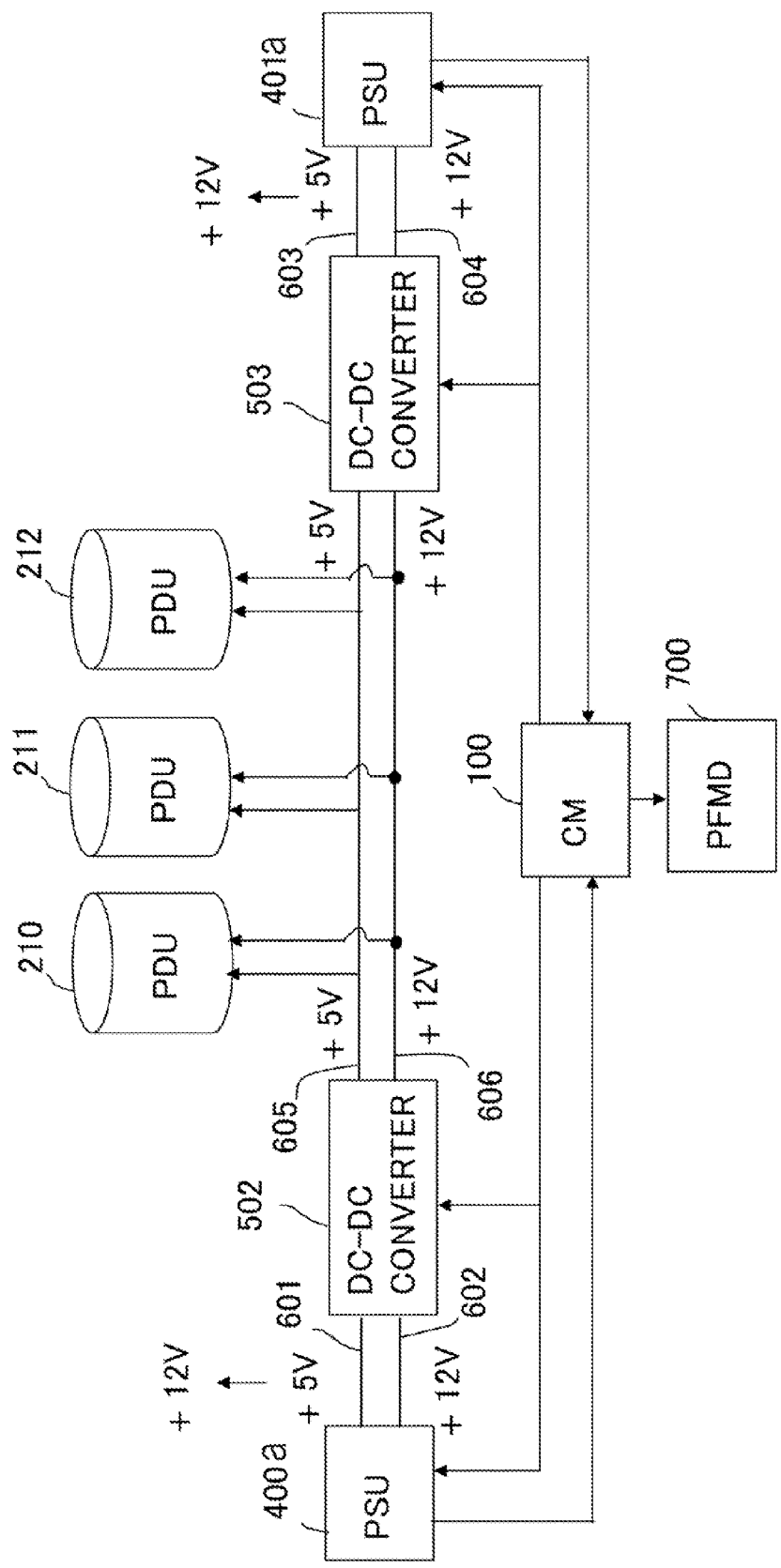

CONTROL APPARATUS AND CONTROL METHOD

CROSS-REFERENCE TO RELATED APPLICATIONS

This application is based upon and claims the benefit of priority of the prior Japanese Patent Application No. 2009-263058, filed on Nov. 18, 2009, the entire contents of which are incorporated herein by reference.

FIELD

The embodiments discussed herein are related to a technology for a control apparatus and control method.

BACKGROUND

A system that performs data management by distributing data into a plurality of disk units for data redundancy such as RAID (Redundant Array of Inexpensive Disks) is well-known. In the RAID system, power supply units for supplying a power to the disk units often have a redundant configuration so as to enhance reliability of the data management. For instance, two power supply units are disposed in the RAID system. Therefore, when one of the power supply units detects an abnormality and stops a voltage output, the other power supply unit supplies the voltage so that a sufficient power supply capacity in the RAID system is obtained. Japanese Laid-open Patent Publication No. 2008-113499 and Japanese National Publication of International Patent Application No. 2006-528479 are examples of conventional technique.

For instance, in the case that two voltages of +12V and +5V are supplied to the disk units, when the abnormality occurs in a voltage generation function of one of the power supply units and the voltage output stops, one of the power supply units in which the abnormality occurs is separated from the RAID system. Under this condition, when the abnormality occurs in the other power supply unit, it is separated similarly from the system as a voltage abnormality. As a result, it becomes impossible to supply the voltage to the disk units. In this case, a maintenance person is dispatched. The abnormality of the power supply unit in the RAID system is described above, however there is a similar problem also in another system that has a redundancy configuration.

SUMMARY

According to an aspect of the invention, a control apparatus controls a first and a second power supply units having a redundant configuration and converters connected to respective outputs of the power supply units. The power supply units generate a plurality of voltages and supply a storage device with the generated voltages through the respective converters. The control apparatus includes a determination unit for determining whether an abnormality occurs in a first voltage that the first power supply unit generates, upon the second power supply unit failing, and an instruction unit for instructing the converter connected to the first power supply unit to generate the first voltage on the basis of a second voltage that the first power supply unit generates, upon the abnormality occurring in the first voltage of the first power supply unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 illustrates a block diagram of power supply connection of a RAID system according to a third embodiment.

DESCRIPTION OF EMBODIMENTS

Hereinafter, a control apparatus according to an embodiment is described in detail with reference to the accompanying drawings.

Figure 1:
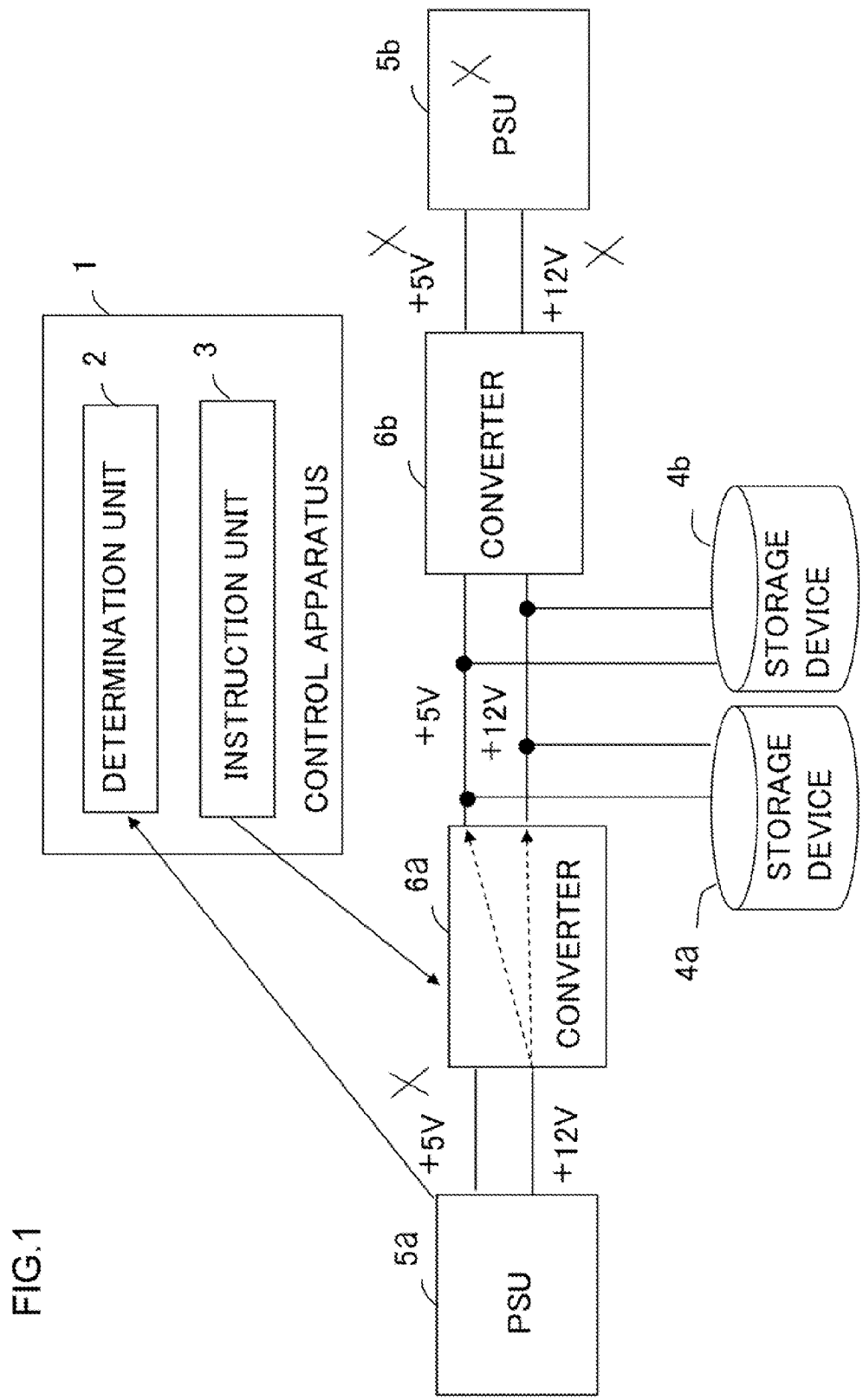
FIG. 1 illustrates a block diagram of a control apparatus according to a first embodiment.

FIG. 1 illustrates a block diagram of a control apparatus 1 according to a first embodiment. The control apparatus 1 of the first embodiment includes a determination unit 2 and an instruction unit 3.

Redundant power supply units (denoted as PSU in the drawings) 5a and 5b generate a plurality of voltages and supply the voltages to storage devices 4a and 4b. When one of the power supply units 5a and 5b fails, the determination unit 2 determines whether an abnormality occurs in a first voltage of the other power supply unit.

In an example illustrated in FIG. 1, each of the power supply units 5a and 5b has a function to generate voltages of +12V and +5V. The determination unit 2 determines whether an abnormality occurs in the voltage of +5V that the power supply unit 5a generates, when the power supply unit 5b fails, namely does not generate the voltages of +12V and +5V.

When the abnormality occurs in the first voltage of the other power supply unit, the instruction unit 3 instructs a converter to generate the first voltage on the basis of a second voltage. The converter is provided on the output side of the other power supply unit. As illustrated in FIG. 1, the abnormality occurs in the voltage of +5V of the power supply unit 5a. Namely, abnormalities occur in the voltage of +5V of the power supply unit 5a and the voltages of +12V and +5V of the power supply unit 5b.

In this case, the instruction unit 3 instructs a converter 6a to generate the voltage of +5V on the basis of the voltage of +12V of the power supply unit 5a in which an abnormality does not occur. The converter 6a is provided on the output side of the power supply unit 5a. When the converter 6a receives the instruction from the instruction unit 3, the converter 6a generates the voltage of +5V on the basis of the voltage of +12V and supplies the voltage of +5V to the storage devices 4a and 4b.

Moreover, when abnormalities occur in the voltage of +12V of the power supply unit 5a and the voltages of +12V and +5V of the power supply unit 5b, the instruction unit 3 instructs the converter 6a to generate the voltage of +12V on the basis of the voltage of +5V of the power supply unit 5a in which an abnormality does not occur.

On the other hand, when abnormalities occur in the voltages of +12V and +5V of the power supply unit 5a and the voltage of +5V of the power supply unit 5b, the instruction unit 3 instructs a converter 6b to generate the voltage of +5V on the basis of the voltage of +12V of the power supply unit 5b in which an abnormality does not occur. The converter 6b is provided on the outside of the power supply unit 5b.

The converter 6b receives the instruction from the instruction unit 3, generates the voltage of +5V on the basis of the voltage of +12V, and supplies the voltage of +5V to the storage devices 4a and 4b. Moreover, when abnormalities occur in the voltages of +12V and +5V of the power supply unit 5a and the voltage of +12V of the power supply unit 5b, the instruction unit 3 instructs the converter 6b, which is provided on the output side of the power supply unit 5b, to generate the voltage of +12V on the basis of the voltage of +5V of the power supply unit 5b in which an abnormality does not occur.

The control apparatus 1 can continuously supply a power to the storage devices 4a and 4b. Therefore, reliability of data management can be improved. Hereinafter, the embodiment is described in detail.

Hereinafter, a disk array system that realizes RAID (Redundant Array of Inexpensive Disks) function is described in detail in a second embodiment referring to the drawings.

Figure 2:
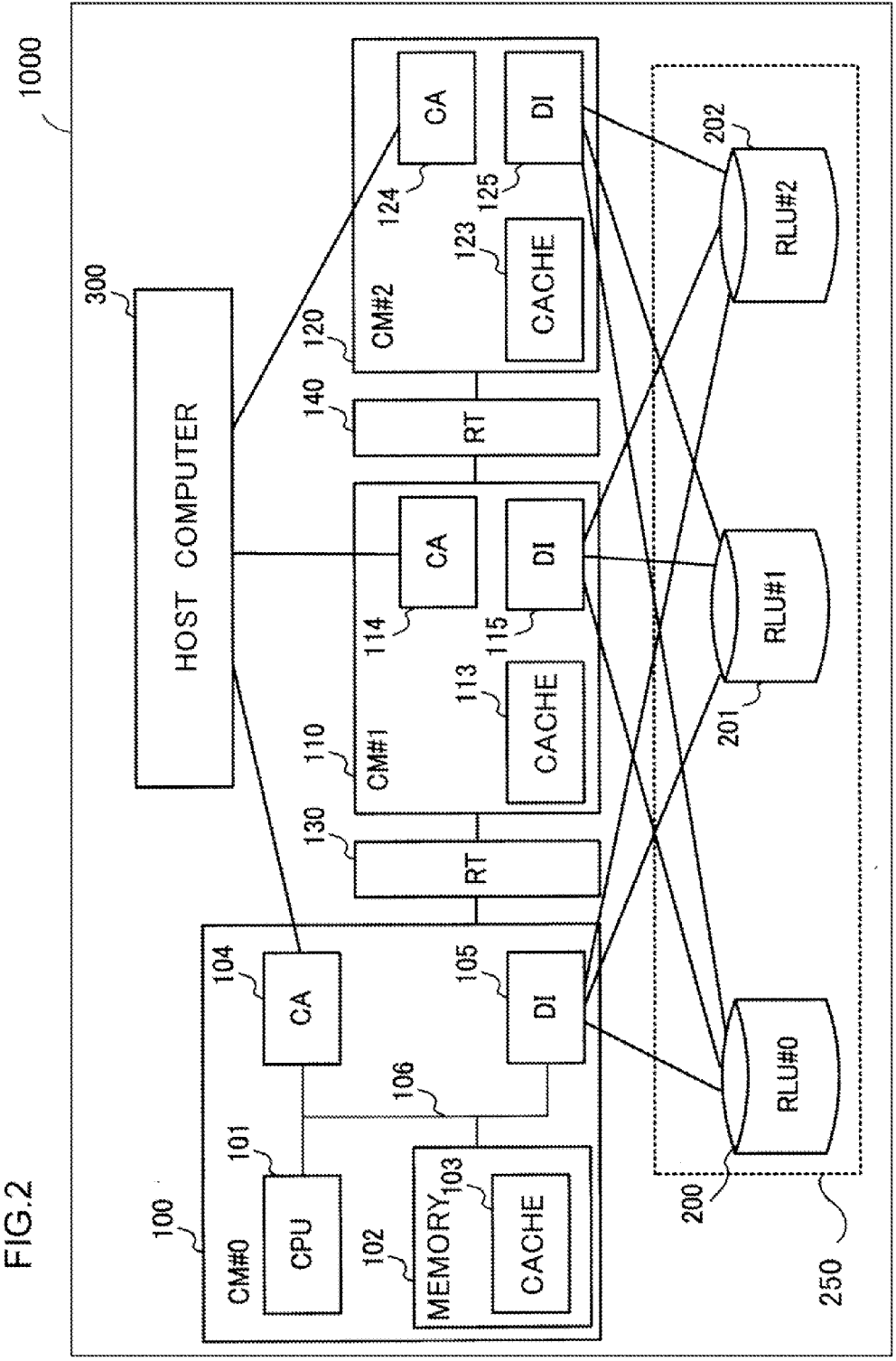
FIG. 2 illustrates a block diagram of a RAID system according to a second embodiment.

FIG. 2 illustrates a block diagram of a RAID system 1000 according to the second embodiment. The RAID system 1000 in the second embodiment includes a host computer 300, a disk array 250 (RAID configuration) that includes logical disk units 200 to 202 and a control module (corresponding to control apparatus in claims) 100, a control module 110 and a control module 120. The host computer and the disk array 250 are connected through the control modules 100, 110 and 120.

The logical disk units 200 to 202 are allocated to one physical disk unit or a plurality of physical disk units, respectively. Here, the disk name that logical disk unit 200 is identified is "RLU#0". The disk name that logical disk unit 201 is identified is "RLU#1". The disk name that logical disk unit 202 is identified is "RLU#2".

Moreover, the module name that the control module 100 is identified is "CM#0". The module name that the control module 110 is identified is "CM#1". The module name that the control module 120 is identified is "CM#2".

A router (denoted as RT in the drawing) 130 is connected between the control module 100 and the control module 110. Moreover, a router (denoted as RT in the drawing) 140 is connected between the control module 110 and the control module 120.

The control modules 100, 110 and 120 execute input/output commands received from the host computer 300, and perform a recovery processing that recovers data of the disk array 250 when a part of the managed disk array 250 fails.

Moreover, the control modules 100, 110, and 120 are used for redundancy configuration. When one of the control modules 100, 110 and 120 fails, the others take over the function of the control module that fails.

Hereinafter, a hardware configuration of the control module 100 is described. A CPU (Central Processing Unit) 101 controls the overall operation of the control module 100. The CPU 101 is connected to a memory 102, a channel adaptor (denoted as CA in the drawing) 104, and a disk interface unit (denoted as DI in the drawing) 105 through a bus 106.

The CPU 101 and the memory 102 are backed up by a battery (not illustrated). A part of the memory 102 is used for a cache 103. The channel adaptor 104 is a circuit that controls a host interface that is connected to the host computer 300.

The disk interface unit 105 is a circuit that controls a disk interface connected to the logical disk units 200 to 202. A configuration of the control module 110 and a configuration of the control module 120 are the same configuration as the control module 100. The control module 110 includes a cache 113, a channel adaptor (denoted as CA in the drawing) 114 and a disk interface unit (denoted as DI in the drawing) 115. The control module 120 includes a cache 123, a channel adaptor (denoted as CA in the drawing) 124 and a disk interface unit (denoted as DI in the drawing) 125.

Figure 3:
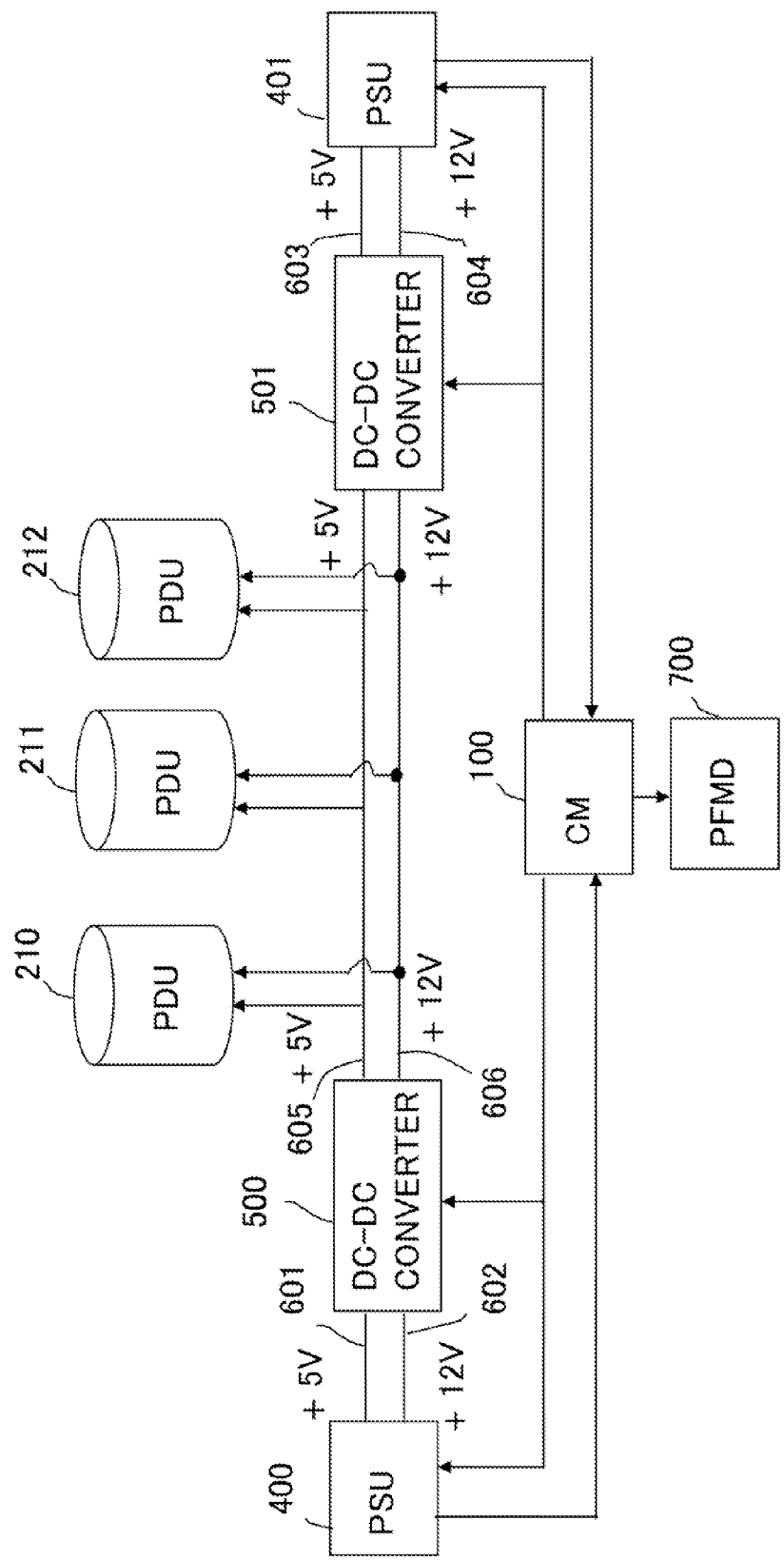
FIG. 3 illustrates a block diagram of power supply connection of the RAID system according to the second embodiment.

Next, power supply connection of the RAID system 1000 is described. FIG. 3 illustrates a block diagram of power supply connection of the RAID system 1000 according to the second embodiment. The RAID system 1000 includes PSUs 400, 401 and DC-DC converters 500, 501 in addition to the above-described functions.

The PSU 400 and the PSU 401 supply appropriate voltages and currents to each device in the RAID system 1000. The PSUs 400, 401 generate the voltages of +12V and +5V.

For instance, the voltage of +5V is a control voltage that is used for controlling the physical disk units (denoted as PDU in the drawings) 210 to 212 to which the logical disk units 200 to 202 are allocated. For instance, the voltage of +12V is a driving voltage that is used for driving motors of the physical disk units 210 to 212.

The voltage of +5V that the PSU 400 generates is output to the DC-DC converter 500 through a power line 601. The voltage of +12V that the PSU 400 generates is output to the DC-DC converter 500 through a power line 602. The voltage of +5V that the PSU 401 generates is output to the DC-DC converter 501 through a power line 603. The voltage of +12V that the PSU 401 generates is output to the DC-DC converter 501 through a power line 604.

The PSUs 400 and 401 notify the control module 100 of a voltage that is not output, when an abnormality occurs in a voltage generation function of the voltage of +5V or +12V. The DC-DC converter 500 is provided on the output side of the PSU 400. The DC-DC converter 501 is provided on the output side of the PSU 401.

Each of the DC-DC converters 500 and 501 increases or reduces the input voltage +12V or +5V as need arises and outputs the increased voltage or the decreased voltage to the physical disk units 210 to 212 through the power line 605 or the power line 606.

A power failure monitoring device (denoted as PFMD in the drawings) 700 totally manages an abnormality of a power supply system of the RAID system 1000 and other system (not illustrated). Next, the configurations of the DC-DC converters 500 and 501 are described.

Figure 4:
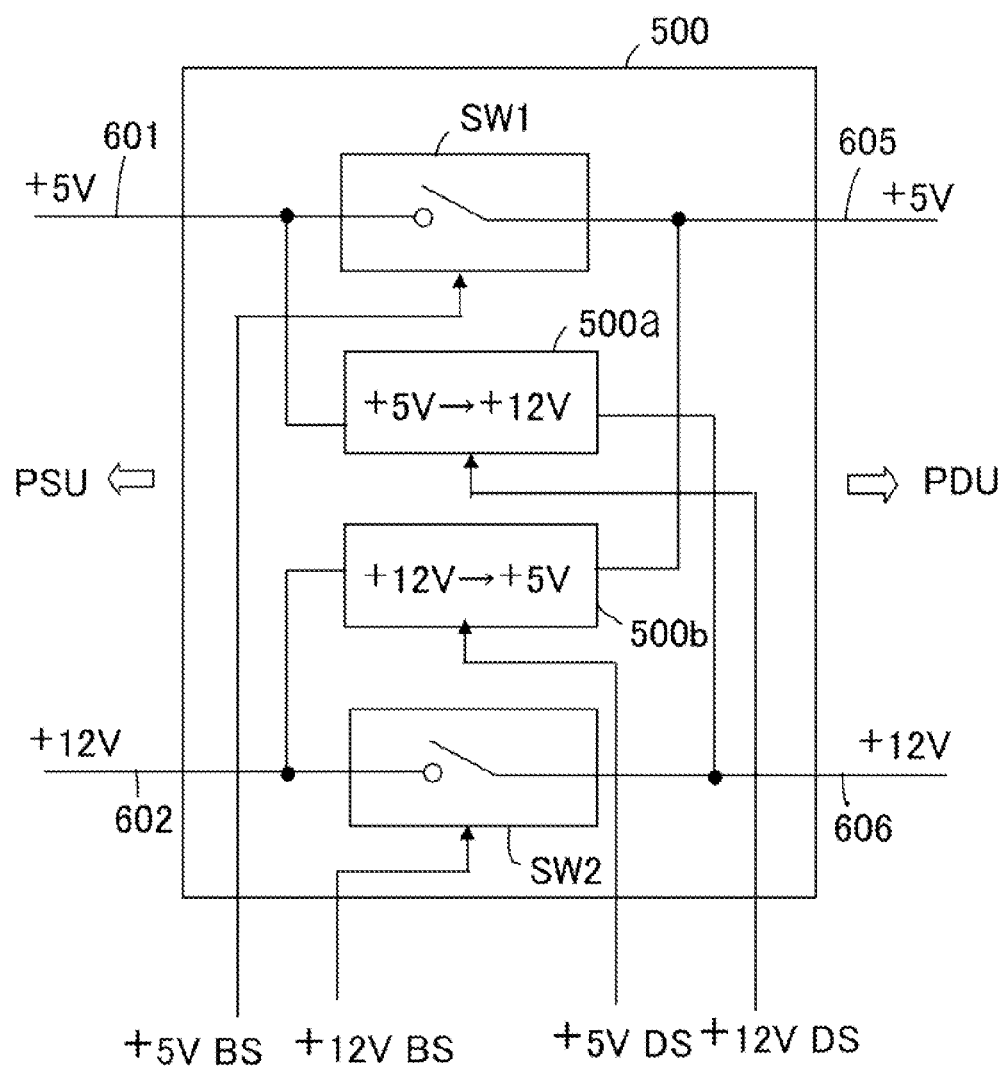
FIG. 4 illustrates a block diagram of a function of a DC-DC converter according to the second embodiment.

FIG. 4 illustrates a block diagram of a function of DC-DC converter 500 according to the second embodiment. The DC-DC converter 500 includes switches SW1, SW2, a voltage increasing unit 500a and a voltage reducing unit 500b.

The control module 100 can supply the DC-DC converter 500 with +5V bypass signal (denoted as +5V BS in the drawings), +12V bypass signal (denoted as +12V BS in the drawings), +5V drive signal (denoted as +5V DS in the drawings) and +12V drive signal (denoted as +12V DS in the drawings). When the +5V bypass signal is supplied to the DC-DC converter 500, the switch SW1 is turned on. When the switch SW1 is turned on, the DC-DC converter 500 supplies the voltage of +5V, which is supplied from the PSU 400 through the power line 601, with the physical disk units 210 to 212 through the power line 605.

When the bypass signal of +12V is supplied to the DC-DC converter 500, the switch SW2 is turned on. When the switch SW2 is turned on, the DC-DC converter 500 supplies the voltage of +12V which is supplied from the PSU 400 through the power line 602 with the physical disk unit 210 to 212 through the power line 606.

The voltage increasing unit 500a includes an input terminal that is connected to the power line 601 and an output terminal that is connected to the power line 606. When the voltage increasing unit 500a receives the drive signal of +12V, the voltage increasing unit 500a increases the voltage from the voltage of +5V to the voltage of +12V. The voltage of +12V obtained by increasing the voltage is supplied to the power line 606.

The voltage reducing unit 500b includes an input terminal that is connected to the power line 602 and an output terminal that is connected to the power line 605. When the voltage reducing unit 500b receives the drive signal of +5V, the voltage reducing unit 500b reduces the voltage from the voltage of +12V to the voltage of +5V. The voltage of +5V obtained by reducing the voltage is supplied to the power line 605.

A function of the DC-DC converter 500 is described above. And the DC-DC converter 501 has the same function as the DC-DC converter 500. When the abnormality does not occur in the PSUs 400 and 401, namely in normal operation, the control module 100 supplies the DC-DC converters 500 and 501 with the bypass signal of +5V and the bypass signal of +12V and thereby turns on switches SW1 and SW2. At this time, the drive signal of +5V and the drive signal of +12V are not supplied to the DC-DC converters 500 and 501. Therefore the voltage increasing unit 500a and the voltage reducing unit 500b are not operated.

Figure 5:
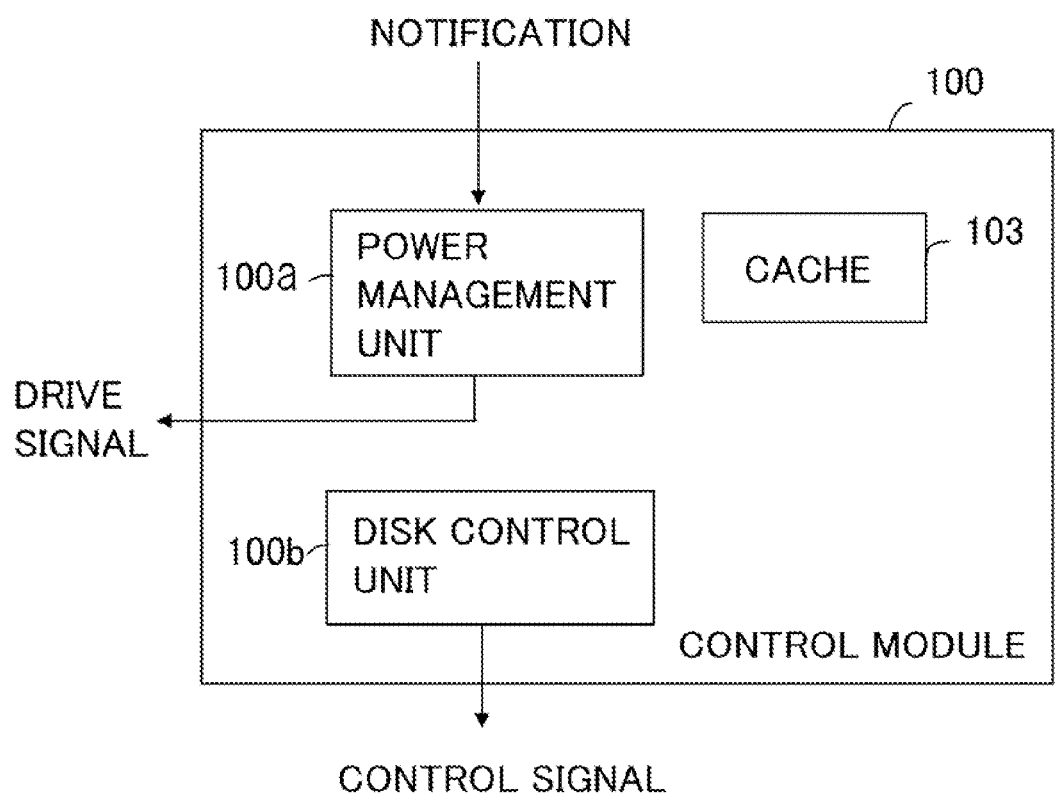
FIG. 5 illustrates a block diagram of a function of a control module.

Next, a function of the control module 100 is described. FIG. 5 illustrates a block diagram of the function of a control module 100. The control module 100 includes a power management unit 100a, a disk control unit 100b (corresponding to controller in claims) and the cache 103.

When the power management unit 100a receives a notification that the voltage is not output from the PSU 400 or the PSU 401, the power management unit 100a outputs a signal for generating the voltage, which is not output from the PSU 400 or the PSU 401, to the DC-DC converter. The DC-DC converter is directly connected to the PSU 400 or the PSU 401 that transmits the notification. For instance, when the voltage of +5V of the PSU 400 is not output, the power management unit 100a outputs the drive signal of +5V to the DC-DC converter 500. Moreover, when the voltage of +12V of the PSU 400 is not output, the power management unit 100a outputs the drive signal of +12V to the DC-DC converter 500.

The cache 103 temporarily stores a request for writing/reading data into/from the physical disk units 210 to 212. When the disk control unit 100b receives the notification that the voltage is not output from the PSU 400 or the PSU 401 via the power management unit 100a, the disk control unit 100b limits the number of operating physical disk units according to power supply capacity. For instance, the number of the operating physical disk units corresponding to the power supply capacity is preliminarily set in the memory 102. And the disk control unit 100b outputs a control signal for setting the physical disk units other than the physical disk units which corresponds to the preliminarily set number into sleep mode. In this case, the disk control unit 100b preferentially sets the physical disk units that a request for writing/reading data is not stored in the cache 103 into the sleep mode.

Figure 6A:
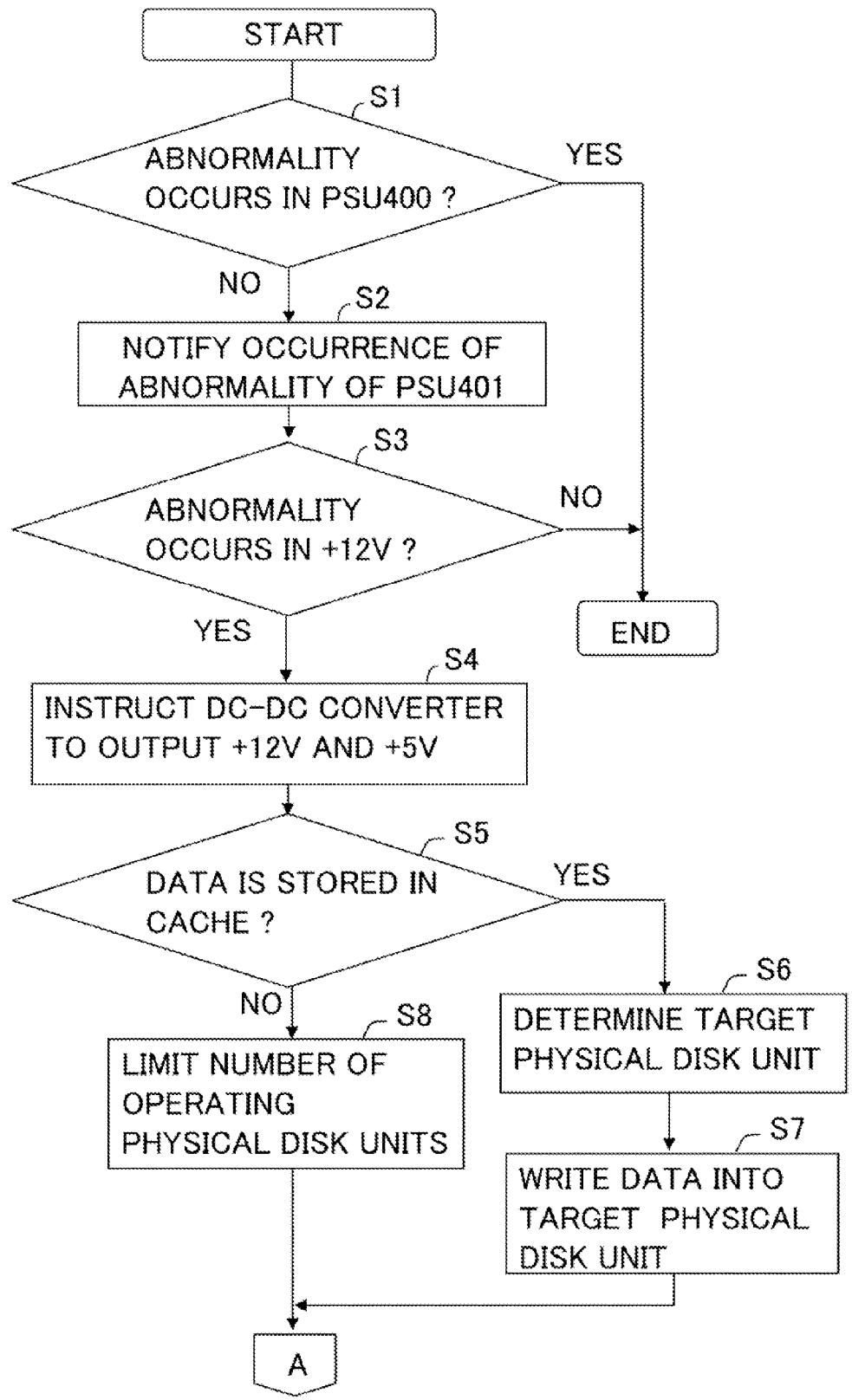
FIGS. 6A and 6B illustrate a flow chart of processing of a control module according to the second embodiment.
Figure 6B:
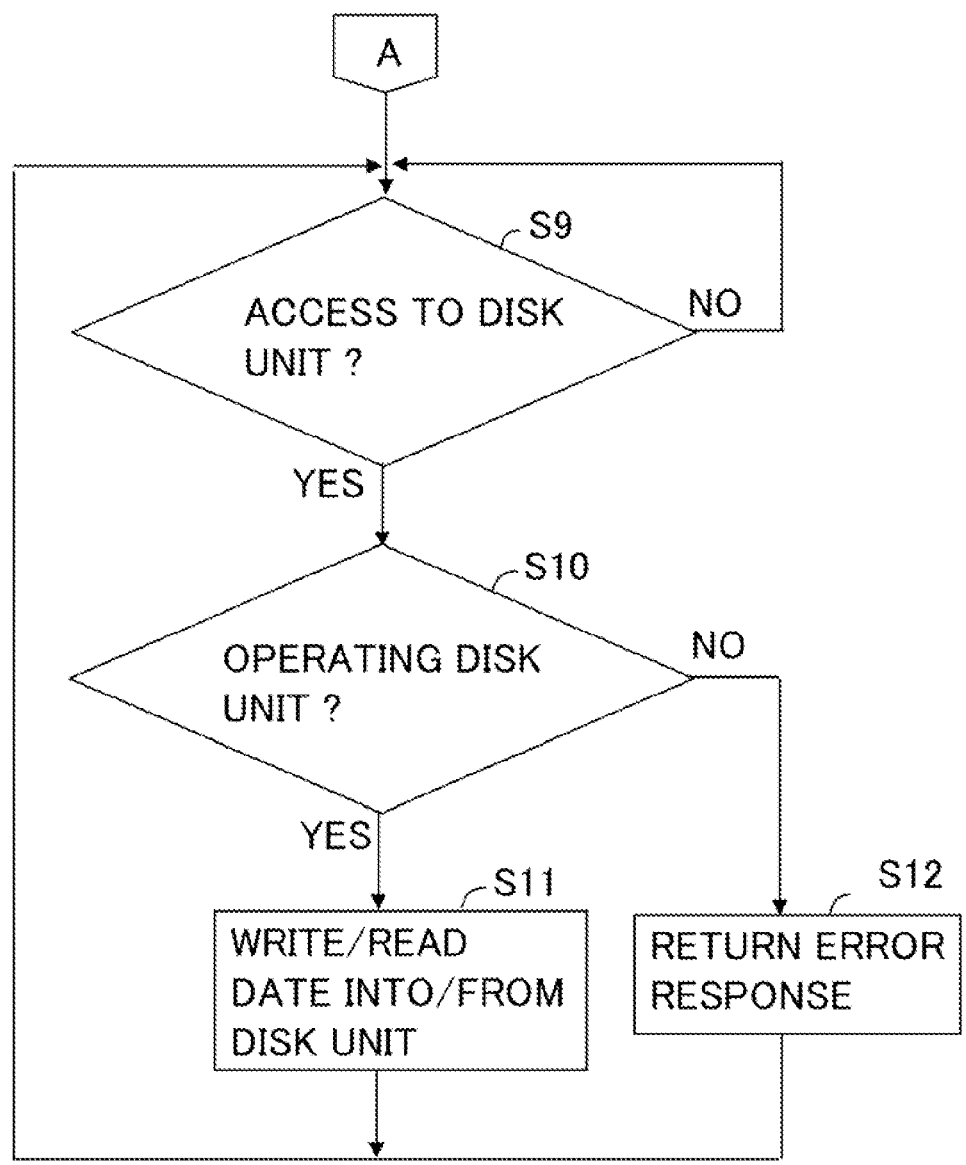

Next, a processing of the control module 100 in a state that an abnormality occurs in the PSU 401 that is one of the PSUs 400 and 401 is described. FIGS. 6A and 6B illustrate a flow chart of processing of the control module 100 according to the second embodiment.

In step S1, first of all, the control module 100 determines whether an abnormality occurs in the voltage generation function of the voltage of +5V of the PSU 400 by checking a ready signal of the PSU 400. When the abnormality occurs in the voltage generation function of the voltage of +5V, the control module 100 determines that the operation of the physical disk units 210 to 212 is not continued. And the control module 100 completes the processing. The processing of the control module 100 moves to step S2 when the abnormality does not occur.

In step S2, the control module 100 notifies the power failure monitoring device 700 of the occurrence of abnormality of the PSU 401. Afterwards, the processing moves to step S3.

In step S3, the control module 100 detects whether an abnormality occurs in the voltage generation function of the voltage of +12V of the PSU 400. The processing moves to step S4 when the abnormality occurs (Yes in step S3). The processing is completed since the control module 100 can supply power to the physical disk units 210 to 212 using the PSU 400 when the abnormality does not occur (No in step S3). In addition, the control module 100 may notify the power failure monitoring device 700 of the occurrence of the abnormality of the PSU 400.

In step S4, the control module 100 instructs the DC-DC converter 500 to output the voltages of +12V and +5V on the basis of the input voltage of +5V. In particular, first of all, the control module 100 provides the bypass signal of +5V and the drive signal of +12V to the DC-DC converter 500. As a result, the DC-DC converter 500 outputs the voltages of +12V and +5V. The control module 100 stops output of the unnecessary bypass signal of +12V. The DC-DC converter 500 continues the output of the bypass signal of +5V. Afterwards, the processing moves to step S5.

In step S5, the control module 100 determines whether data is stored in the cache 103. The processing moves to step S6 when data is stored in the cache 103. The processing moves to step S8 when data is not stored in the cache 103.

In step S6, for instance, the control module 100 determines a target physical disk unit for writing data by checking, for instance, a destination address for the stored data. The control module 100 supplies a power only to the target physical disk unit for writing data, and allows others of the physical disk units to be in the sleep mode that is in a rotation stop state of the physical disk units. Afterwards, the processing moves to step S7.

In step S7, the control module 100 writes data into the target physical disk unit that the power is supplied. Afterwards, the processing moves to step S9. When the number of the target physical disk units for writing data is higher than the number of the operating physical disk units, for instance, the operating physical disk units that complete writing data are set to be in the sleep mode. Afterward, the control module 100 allows the physical disk units in the sleep mode to operate and writes data into the physical disk units.

In step S8, the control module 100 limits the number of the operating physical disk units according to the power supply capacity. For instance, the number of the operating physical disk units corresponding to the power supply capacity is preliminarily set in the memory 102. And the disk control unit 100b sets the physical disk units other than the physical disk units which correspond to the preliminarily set number into sleep mode. Afterward, the processing moves to step S9.

In step S9, the control module 100 determines whether an access to the physical disk units 210 to 212 is requested. The processing moves to step S10 when the access to physical disk units 210 to 212 is requested (Yes at step S9). When the access to the physical disk units 210 to 212 is not requested (No at step S9), the access to physical disk units 210 to 212 is waited.

In step S10, the control module 100 determines whether the access to the operating physical disk units is requested. The processing moves to step S11 when the access to the operating physical disk units is requested (Yes at step S10).

The processing moves to step S12 when the access to the operating physical disk units is not requested (No at step S10).

In step S11, the control module 100 writes data into the physical disk units according to the request for the access, or reads data from the physical disk units. Afterwards, the processing moves to step S9.

In step S12, the control module 100 returns an error response to the access source. Afterwards, the processing moves to step S9.

The processing is completed as described above. The above-described processing sequence is one example, but not limited to this. For instance, the processing at step S2 may be performed after step S3. As described above, in the RAID system 1000, when one voltage from one of the PSU 400 and the PSU 401 is output, the DC-DC converter 500 or the DC-DC converter 501 assists the supply of the voltage that the PSU 400 and the PSU 401 stop outputting. As a result, the RAID system 1000 enhances the possibility of continuing the data access to the physical disk units 210 to 212, and therefore the reliability of the RAID system 1000 can be improved.

Next, a RAID system 1000 according to a third embodiment is described. Hereinafter, the RAID system 1000 according to the third embodiment is described by focusing on the difference with the RAID system 1000 according to the second embodiment, and the description for the same configuration is omitted.

FIG. 7 illustrates a block diagram of power supply connection of the RAID system 1000 according to the third embodiment. As illustrated in FIG. 7, the RAID system 1000 according to the third embodiment is different from the second embodiment on the configuration of the PSU.

PSUs 400a and 401a can output the voltage of +12V from respective output terminals that outputs the voltage of +5V. As a result, the voltage of +12V is output to the power lines 601 and 603.

Figure 8:
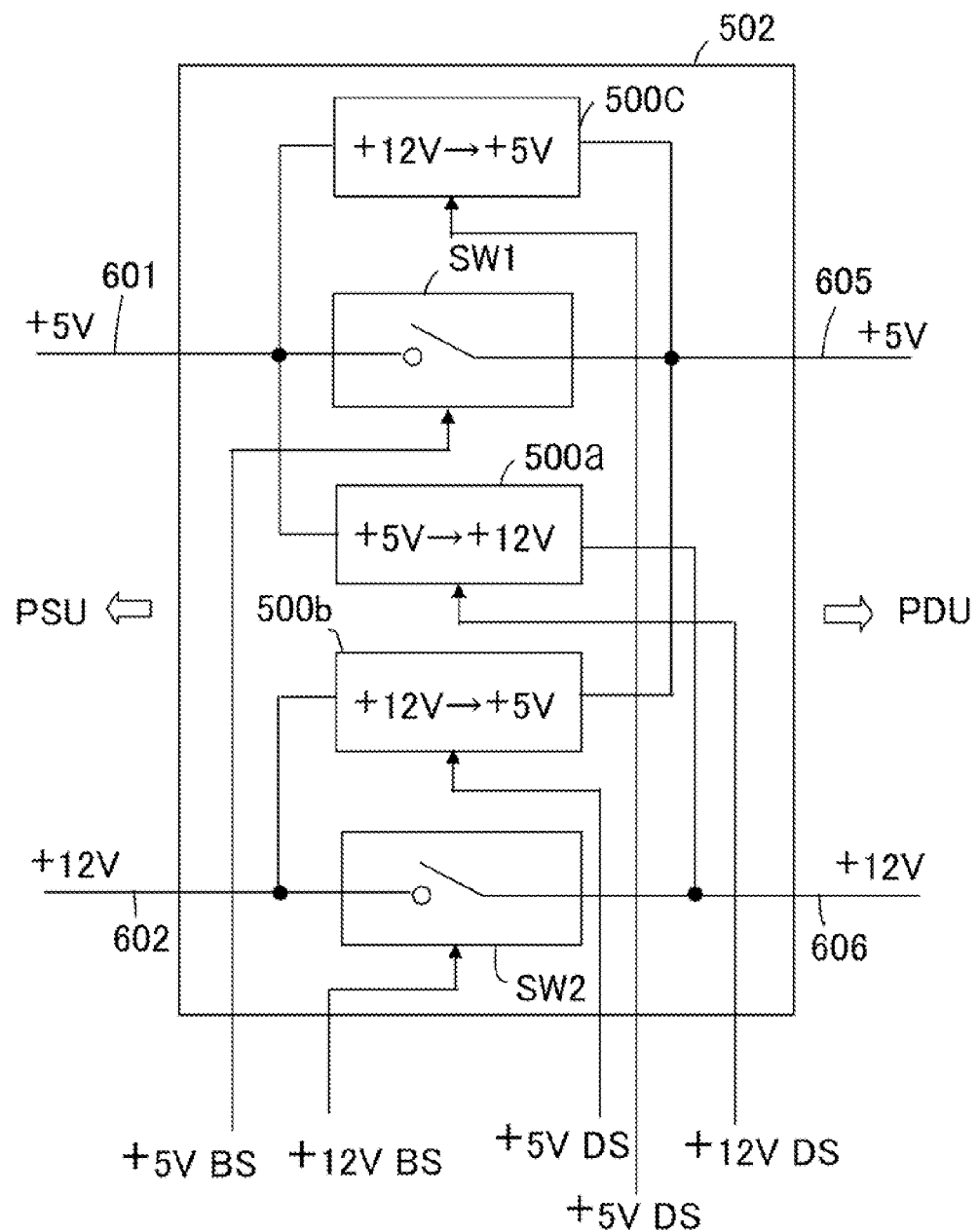
FIG. 8 illustrates a block diagram of a function of a DC-DC converter according to the third embodiment.

When an abnormality occurs in the voltage generation function of one of the PSUs 400a and 401a, the control module 100 notifies the other PSU of an instruction to increase the voltage from the voltage of +5V to the voltage of +12V, FIG. 8 illustrates a block diagram of a function of a DC-DC converter 502 according to the third embodiment. The DC-DC converter 502 further includes a voltage reducing unit 500c. The voltage reducing unit 500c includes an input terminal that is connected to the power line 601 and an output terminal that is connected to the power line 605.

When the voltage reducing unit 500c receives the drive signal of the +5V, the voltage reducing unit 500c reduces the voltage from the voltage of +12V to the voltage of +5V. The voltage obtained by reducing the voltage is supplied to the power line 605. Here, the voltage reducing unit 500b and the voltage reducing unit 500c receives the respective drive signals of +5V and operate independently.

The DC-DC converter 503 has the same function as the function of the DC-DC converter 502 described above. Next, for instance, the processing of the control module 100 is described when an abnormality occurs in the PSU 401a that is one of the PSUs 400a and 401a.

Figure 9:
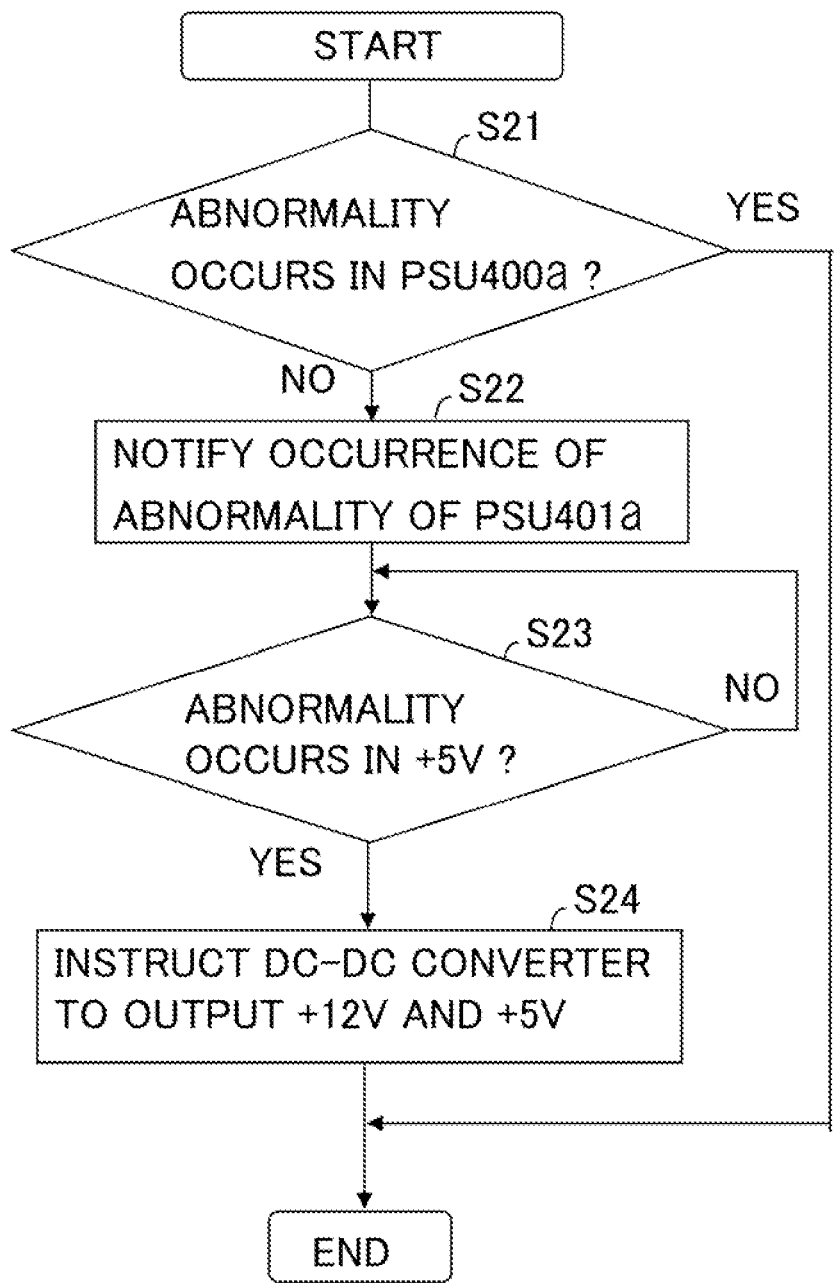
FIG. 9 illustrates a flow chart of processing of a control module according to the third embodiment.

FIG. 9 illustrates a flow chart of processing of the control module 100 according to the third embodiment. In step S21, first of all, the control module 100 determines whether an abnormality occurs in the voltage generation function of the PSU 400a by checking a ready signal of the PSU 400a. When the abnormality occurs, the processing is completed. The processing moves to step S22 when the abnormality does not occur.

In step S22, the control module 100 notifies the power failure monitoring device 700 of the occurrence of abnormality of the voltage generation function of the PSU 401a. Afterwards, the processing moves to step S23.

In step S23, the control module 100 detects whether the abnormality occurs in the voltage generation function of the voltage of +5V of the PSU 400a. When the abnormality occurs in the voltage generation function of the PSU 401a and the abnormality occurs in the voltage generation function of the voltage of +5V of the PSU 400a (Yes at step 23), the processing moves to step S24. When the abnormality does not occur (No in step S23), the control module 100 continues to monitor the occurrence of the abnormality of the voltage of +5V.

In step S24, the control module 100 transmits a release instruction of the bypass signal of +5V to the DC-DC converter 502. As a result, the switch SW1 is turned off, and the connection between the power line 601 and the power line 605 is temporarily cut off. In this case, the supply of the control voltage to the physical disk units 210 to 212 is preferably prevented from stopping by using, for instance, the capacitor (not illustrated).

Moreover, the control module 100 transmits to the PSU 400a a change instruction of a supply voltage. Thereby, the PSU 400a changes the output voltage from the output voltage of +5V to the output voltage of +12V. In addition, the control module 100 supplies the drive signal of +5V to the voltage reducing unit 500c of the DC-DC converter 502. As a result, the voltage reducing unit 500c reduces the voltage from the voltage of +12V, which is supplied through the power line 601, to the voltage of +5V, and outputs the voltage of +5V to the physical disk units 210 to 212 through the power line 605.

It is preferable that these processing is executed while the supply of the control voltage to the physical disk units 210 to 212 is prevented from stopping by using, for instance, the capacitor. With this, the processing of the control module 100 is completed.

The advantage similar to that of the RAID system 1000 in the second embodiment is obtained according to the RAID system 1000 in this third embodiment. And, even when the abnormality occurs in the voltage generation function of the voltages of +5V and +12V of the PSU401 and the voltage generation function of the voltage of +5V of the PSU400, the data access to the physical disk units 210 to 212 can be continued according to the RAID system 1000 in the third embodiment.

Next, a RAID system 1000 according to a fourth embodiment is described. Hereinafter, the RAID system 1000 according to the fourth embodiment is described by focusing on the difference with the RAID system 1000 according to the second embodiment, and the description for the same elements is omitted.

As described above, since the voltage of +12V is used for the motor drive of the physical disk units 210 to 212, the variation of consumption current for the voltage of +12V may be larger than the variation of consumption current for the voltage of +5V. Even if the physical disk units 210 to 212 are exchanged to other physical disk units which have larger consumption current values and therefore the output current of the PSU 400 or PSU 401 becomes large, the RAID system 1000 according to the fourth embodiment is prevented from stopping the system.

Figure 10:
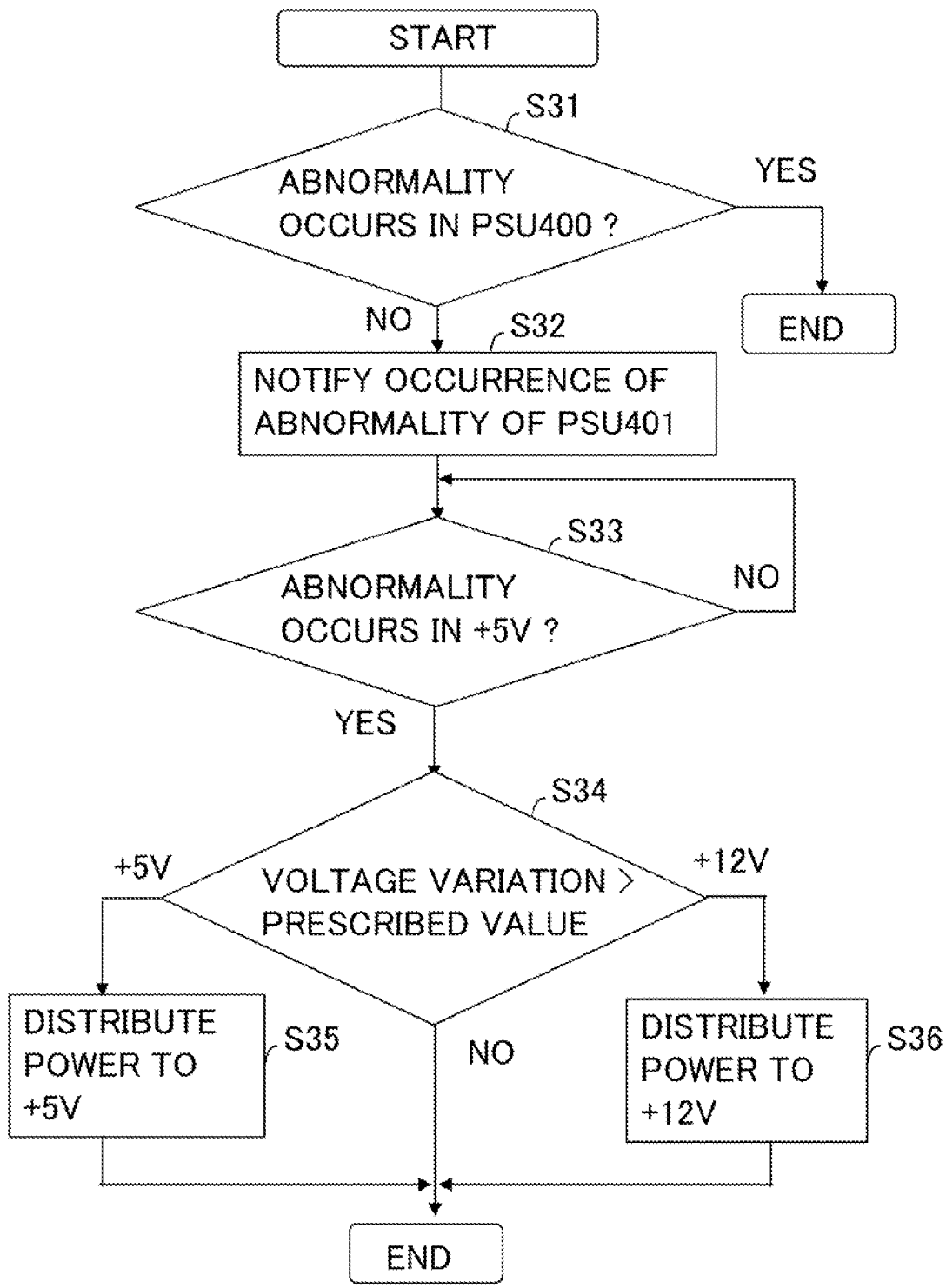
FIG. 10 illustrates a flow chart of processing of a control module according to a fourth embodiment.

Hereinafter, for instance, a processing of a control module 100 is described when an abnormality occurs in the PSU 401 that is one of the PSUs 400 and 401. FIG. 10 illustrates a flow chart of the processing of the control module 100 according to the fourth embodiment.

In step S31, first of all, the control module 100 determines whether the abnormality occurs in the voltage generation function of the PSU 400 by checking a ready signal of the PSU 400. When an abnormality occurs, the processing is completed. When the abnormality does not occur, the processing moves to step S22.

In step 32, the control module 100 notifies the power failure monitoring device 700 of the occurrence of the abnormality in the voltage generation function of the PSU 401. Afterwards, the processing moves to step S33.

In step 33, the control module 100 detects whether the abnormality occurs in the voltage generation function of +5V of the PSU 400. When the abnormality occurs (Yes at step S33), the processing moves to step S34. When the abnormality does not occur (No at step S33), the control module 100 continues to monitor whether the abnormality occurs in the voltage generation function of the voltage of +5V.

In step 34, the control module 100 determines whether variation of either of the voltage of +5V or the voltage of +12V exceeds a prescribed value (for instance, 4%). When the variation of the voltage of +5V exceeds the prescribed value (+5V at step S34), the processing moves to step S35. When the variation of the voltage of +12V exceeds the prescribed value (+12V at step S34), the processing moves to step S36. When both the variation of the voltage of +5V and the variation of the voltage of +12V do not exceed the prescribed value (No at step S34), the processing is completed.

In step 35, the control module 100 outputs an instruction that distributes a portion of the power of the input voltage of +12V to the voltage of +5V, to the DC-DC converter 500. In particular, the drive signal of +5V is supplied to the voltage reducing unit 500b. As a result, the portion of the power of the input voltage of +12V is distributed to the voltage of +5V. Afterwards, the processing is completed.

In step 36, the control module 100 outputs an instruction that distributes a portion of the power of the input voltage of +5V to the voltage of +12V to the DC-DC converter 500. In particular, the drive signal of +12V is supplied to the voltage increasing unit 500a. As a result, the portion of the power of the input voltage of +5V is distributed to the voltage of +12V. Afterwards, the processing is completed.

After the processing is completed, the control module 100 continues to monitor the voltage value and checks whether the voltages +12V and +5V are a normal value. The advantage similar to the RAID system 1000 in the second embodiment is obtained according to the RAID system 1000 in this fourth embodiment.

And, according to the RAID system 1000 in the fourth embodiment, for instance, even if the physical disk units 210 to 212 are exchanged to other physical disk units which have larger consumption current values and the output current of the PSU 400 or PSU 401 becomes large, overcurrent can be controlled by distributing a portion of a surplus power of the voltage of +5V to the voltage of +12V. Therefore, the reliability of The RAID system 1000 can be improved.

Although embodiments that the RAID system 1000 includes two PSUs 400 and 401 are described above, the RAID system 1000 may include more than three PSUs.

Moreover, although each of the PSUs 400 and 401 has the two voltages of +5V and +12V, the PSUs 400 and 401 may have more than three types of the voltages.

The above processing functions can be realized by a computer. In this case, a program describing details of processing for realizing the functions which the control module 100 has is provided. When the computer executes the program, the above processing functions of the control module 100 can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (Rewritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A control apparatus for controlling a first and a second power supply units and converters connected to respective outputs of the power supply units, the power supply units generating a plurality of voltages and supplying a storage device with the generated voltages through the respective converters, the control apparatus comprising:

a determination unit for determining whether an abnormality occurs in a first voltage having a first given voltage value and a second voltage having a second given voltage value that the first power supply unit generates, upon the second power supply unit failing to supply the first voltage and the second voltage; and an instruction unit for instructing the converter connected to the first power supply unit to generate the first voltage having the first given voltage value to supply the generated first voltage to the storage device on the basis of the second voltage that the first power supply unit generates, upon the abnormality occurring in the first voltage of the first power supply unit, and instructing the converter connected to the first power supply unit to generate the second voltage having the second given voltage value to supply the generated second voltage to the storage device on the basis of the first voltage that the first power unit generates, upon the abnormality occurring in the second voltage of the first power supply unit, wherein the first power supply unit and the second power supply unit have a redundant configuration.

2. The control apparatus according to claim 1, further comprising:
a controller for limiting the number of operating storage devices corresponding to a power capacity of the first power supply unit when a plurality of the storage devices are deposited, and accessing only the operating storage devices of the limited number, upon receiving an access request to the storage devices.

3. The control apparatus according to claim 2, further comprising:
a cache for storing a write data, wherein the controller preferentially accesses the storage devices in which the write data stored in the cache is written.

4. The control apparatus according to claim 2, wherein one of the first voltage and the second voltage is a control voltage for controlling the storage device, the other is a drive voltage for driving the storage device, wherein the controller limits the number of the operating storage devices when the first voltage is the drive voltage.

5. The control apparatus according to claim 1, wherein, when a variation of the first voltage is more than or equal to the prescribed threshold value, the instruction unit instructs the converter to generate the first voltage from the second voltage.

6. The control apparatus according to claim 1, wherein one of the first voltage and the second voltage is a control voltage for controlling the storage device, the other is a drive voltage for driving the storage device.

7. The control apparatus according to claim 1, wherein, the instruction unit instructs the first power supply unit, which is connected to the converter through a first power line to output one of the first voltage and the second voltage having a larger voltage value than the first voltage and is connected to the converter through a second power line to output the second voltage, to change an output voltage that is output to the converter through the first power line from the first voltage to the second voltage when the first voltage of the first power supply unit is output to the converter through the first power line and when the abnormality occurs in the first voltage of the first power supply unit, and the instruction unit instructs the converter connected to the first power supply unit to convert the second voltage input through the first power line into the first voltage to supply the converted first voltage to the storage device.

8. A control method for a computer for controlling a first and a second power supply units having a redundant configuration and converters connected to respective outputs of the power supply units, the power supply units generating a plurality of voltages and supplying a storage device with the generated voltages through the respective converters, the method comprising:

determining whether an abnormality occurs in a first voltage having a first voltage value and a second voltage having a second voltage value that the first power supply unit generates, upon the second power supply unit failing to supply the first voltage and the second voltage; and instructing the converter connected to the first power supply unit to generate the first voltage having the first given voltage value to supply the generated first voltage to the storage device on the basis of the second voltage that the first power supply unit generates, upon the abnormality occurring in the first voltage of the first power supply unit, and instructing the converter connected to the first power supply unit to generate the second voltage having the second given voltage value to supply the generated second voltage to the storage device on the basis of the first voltage that the first power unit generates, upon the abnormality occurring in the second voltage of the first power supply unit.

9. A storage system comprising:
a storage device;
a first power supply unit to output a first voltage having a first voltage value and a second voltage having a second voltage value;
a first converter being connected to the first power supply unit and the storage device, the first converter supplying the first and second voltages input from the first power supply unit to the storage device;
a second power supply unit to output the first and second voltages, the first and second power supply units having a redundant configuration;
a second converter being connected to the second power supply unit and the storage device, the second converter supplying the first and second voltages input from the second power supply unit to the storage device; and
a controller including a processor operable to:
determine whether an abnormality occurs in one of the first and second voltages that the first power supply unit generates, upon the second power supply unit failing to supply the first and second voltages to the storage device through the second converter,
instruct the first converter to generate the first voltage based on the second voltage of the first power supply unit to supply the generated first voltage to the storage device, upon the abnormality occurring in the first voltage of the first power supply unit, and
instruct the first converter to generate the second voltage based on the first voltage of the first power unit to supply the generated second voltage to the storage device, upon the abnormality occurring in the second voltage of the first power supply unit.

* * * * *